(12) United States Patent
Trattler

(10) Patent No.: US 7,778,055 B2
(45) Date of Patent: Aug. 17, 2010

(54) VOLTAGE CONVERTER

(75) Inventor: Peter Trattler, Graz (AT)

(73) Assignee: Austriamicrosystems AG, Unterpremstätten (AT)

( * ) Notice: Subject to any disclaimer, the term of this patent is extended or adjusted under 35 U.S.C. 154(b) by 213 days.

(21) Appl. No.: 11/908,732

(22) PCT Filed: Mar. 17, 2006

(86) PCT No.: PCT/EP2006/002492

§ 371 (c)(1),
(2), (4) Date: May 23, 2008

(87) PCT Pub. No.: WO2006/097328

PCT Pub. Date: Sep. 21, 2006

(65) Prior Publication Data

US 2009/0016084 A1    Jan. 15, 2009

(30) Foreign Application Priority Data

Mar. 18, 2005   (DE)   ..................... 10 2005 012 662

(51) Int. Cl.
G05F 1/10 (2006.01)

(52) U.S. Cl. .................. 363/59; 327/536; 327/537; 327/538

(58) Field of Classification Search .................. 363/59, 363/60; 327/536, 537, 538
See application file for complete search history.

(56) References Cited

U.S. PATENT DOCUMENTS

| | | |
|---|---|---|
| 4,583,157 A | 4/1986 | Kirsch et al. |
| 5,969,565 A * | 10/1999 | Naganawa .................. 327/536 |
| 7,443,230 B2 * | 10/2008 | Chen et al. .................. 327/535 |
| 7,598,711 B2 * | 10/2009 | Krah et al. .................. 320/140 |
| 2002/0003448 A1 | 1/2002 | Deml et al. |
| 2002/0175745 A1 * | 11/2002 | Kim ........................... 327/536 |
| 2003/0107428 A1 * | 6/2003 | Khouri et al. ............... 327/536 |
| 2004/0041620 A1 | 3/2004 | D'Angelo et al. |
| 2004/0233144 A1 * | 11/2004 | Rader et al. .................... 345/82 |
| 2005/0047181 A1 | 3/2005 | Yamamoto et al. |

FOREIGN PATENT DOCUMENTS

DE    10017920    10/2001

(Continued)

OTHER PUBLICATIONS

"480mA White LED 1x/1.5x/2x Charge Pump for Backlighting and Camera Flash" [Online] 2004, pp. 1-14, XP002390437, found on the Internet: URL: http://www.ortodoxism.ro/datasheets2/8/0u338z96sikzfliqktqxyik78wpy.pdf> [found on Jul. 14, 2006].
Translation of International Preliminary Report on Patentability from the corresponding PCT application No. PCT/EP2006/002492, dated Oct. 11, 2007, 9 pages.
German language International Search Report on Patentability from the corresponding PCT application No. PCT/EP2006/002492, mailed Sep. 5, 2006, 11 pages.

(Continued)

*Primary Examiner*—Bao Q Vu
(74) *Attorney, Agent, or Firm*—Fish & Richardson P.C.

(57) ABSTRACT

An apparatus includes a voltage converter for supplying voltage to an electrical load. The voltage converter is electrically connected at an output to a terminal of a series circuit. The voltage converter includes mechanisms for connecting the electrical load and a current sink. The voltage supplied by the voltage converter is dependent on an input voltage and on a present multiplication factor. The apparatus also includes a first comparator, a second comparator, and selection logic.

21 Claims, 7 Drawing Sheets

FOREIGN PATENT DOCUMENTS

| | | |
|---|---|---|
| DE | 60003276 | 5/2004 |
| EP | 1111763 | 6/2001 |
| WO | WO 01/08282 | 2/2001 |

OTHER PUBLICATIONS

"Regulated 5V Charge-Pump DC-DC Converter", MAX617, Maxim Integrated Products, USA, 1996, pp. 1-7.

* cited by examiner

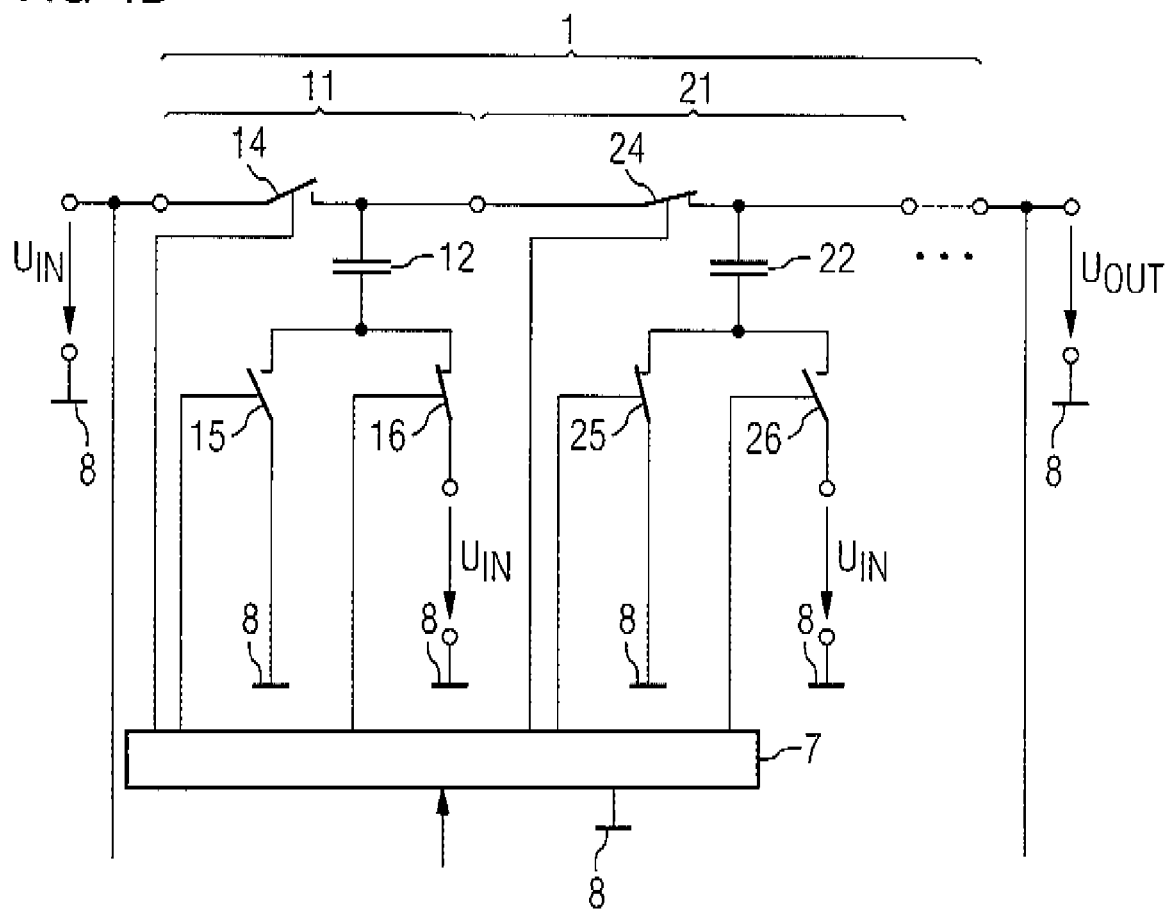
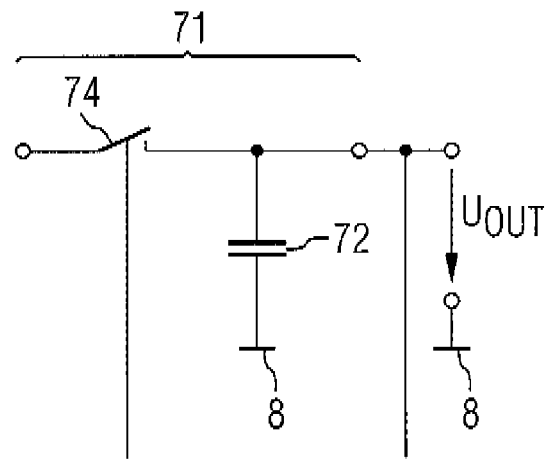

VOLTAGE CONVERTER

TECHNICAL FIELD

This patent application relates to an arrangement comprising a voltage converter for the voltage supply of an electrical load, and a method for supplying an electrical load with voltage.

BACKGROUND

The arrangement can be used when supplying light emitting diodes, abbreviated to LEDs, such as are used for instance in portable telephones and digital cameras.

Voltage converters, referred to as direct current/direct current converter, abbreviated to DC/DC converter, usually serve to convert a low voltage into a higher voltage. The ratio of the output voltage to the input voltage can often be established by choosing a multiplication factor. Voltage converters are employed for example in generating flashes with an LED and the backlighting of a display.

Portable devices are usually operated using a battery and therefore do not have a constant voltage for the electrical load to be supplied, such as an LED, for instance. However, the function of the load should not be influenced by a decreasing input voltage. For this reason, it is possible to operate voltage converters with an additional circuit for setting the multiplication factor.

If a plurality of LEDs of different types or with manufacturing tolerances are operated in parallel, the situation can occur in which the multiplication factor has to be increased in order to be able to operate an LED with a high threshold voltage. This results in an impaired efficiency of the overall arrangement.

SUMMARY

Described herein is an arrangement comprising:
- a voltage converter, which is connected at an output to a terminal of a series circuit, comprising means for connecting an electrical load and a current sink, and the output voltage of which has a dependence on an input voltage and on a present multiplication factor,
- a first comparator, which is coupled at a sampling input to the current sink for feeding in a current sink voltage and which is set up for comparing the current sink voltage with a lower threshold value,
- a second comparator, which is coupled at a sampling input to the current sink for feeding in the current sink voltage, to which a signal derived from the input voltage can be fed at a further sampling input, which is set up for determining an upper threshold value in a manner dependent on the present multiplication factor, on a new, smaller multiplication factor, on the predetermined lower threshold value and on the signal derived from the input voltage and which is set up for comparing the current sink voltage with the upper threshold, and
- a selection logic, which is connected to outputs of the first and second comparators and to a control input of the voltage converter for predetermining the present multiplication factor and is designed for predetermining a new, larger multiplication factor compared with the present multiplication factor from a set of selectable values of the multiplication factor if the current sink voltage falls below the lower threshold value, and for predetermining the new, smaller multiplication factor if the current sink voltage exceeds the upper threshold value.

The voltage converter generates an output voltage that is dropped across the electrical load and the current sink. The following therefore holds true in an idealized situation:

$$U_{OUT} = m \cdot U_{IN} \text{ and } U_{OUT} = U_{SINK} + U_L,$$

where $U_{OUT}$ is the output voltage of the voltage converter, m is the multiplication factor, $U_{IN}$ is the input voltage of the voltage converter, $U_{SINK}$ is the voltage across the current sink, called current sink voltage in the present case, and $U_L$ is the voltage across the electrical load. The electrical load can comprise a plurality of electrical components connected in series.

The current through the electrical load is kept constant by the current sink. If the output voltage of the voltage converter rises, then the current sink serves for taking up the excess voltage. This avoids an increase in the voltage across the electrical load and the current through the electrical load. The voltage across the electrical load and the current through the electrical load are therefore practically constant.

For setting the multiplication factor, the current sink voltage is fed to a comparator, which provides a signal if the current sink voltage falls below a lower threshold value. The lower threshold value is dependent on the implementation of the current source chosen. In this case, the electrical load is no longer supplied to a sufficient extent and the multiplication factor is increased.

The current sink voltage is likewise fed to a second comparator, which compares the current sink voltage with an upper threshold value. If the current sink voltage exceeds the upper threshold value, then the second comparator outputs a signal, with the result that a lower multiplication factor of the voltage converter is set. This reduction of the multiplication factor brings about an increase in the efficiency of the voltage supply since the multiplication factor is chosen to be as high as necessary, but no higher.

The voltage converter may be set up in such a way that it can generate integral multiplication factors without additional switch outlay.

If, in one development, a further electrical load is connected to a further current sink and operated in parallel with the series circuit, comprising the electrical load and the current sink, from the voltage converter, then a voltage drop occurs in two current sinks, which is converted into heat. By a series connection of the further electrical load and the electrical load, no space is required for the further current sink and the further current sink is omitted as a consumer of electrical power. A series connection of loads in combination with a voltage converter with a plurality of multiplication factors thus increases the efficiency of the arrangement even further.

In one embodiment, the electrical load is connected to the reference potential terminal. The current sink voltage results from the difference between the potential of the output voltage terminal of the voltage converter and the potential of a circuit node of the series circuit that is formed between the electrical load and the current sink.

In an embodiment, the electrical load can be connected to the output of the voltage converter. In this case, the current sink voltage is the potential difference between the potential of the circuit node of the series circuit that is formed between the electrical load and the current sink and the reference potential. The advantage lies in a simpler implementation of the comparison of the current sink voltage with the lower threshold value by the first comparator and the comparison of the current sink voltage with the upper threshold value by the second comparator.

A respective value is to be predetermined for the lower and the upper threshold value. However, the upper threshold value can advantageously be determined in a manner dependent on the lower threshold value. The lower threshold value is a function of the required current and the realization of the current sink.

The upper threshold value is determined as follows:

$$U_{OSW} = U_{USW} + U_{IN} \cdot (m_{PRES} - m_{NEW}),$$

where $U_{OSW}$ is the upper threshold value, $U_{USW}$ is the lower threshold value, $U_{IN}$ is the input voltage, $m_{PRES}$ is the present multiplication factor and $m_{NEW}$ is the new, smaller multiplication factor. One advantage of the device according to this specification is that if the current sink voltage reaches the upper threshold value, after the changeover of the multiplication factor, the current sink voltage is identical to the lower threshold value.

If the multiplication factors are whole and consecutive numbers greater than or equal to 1, the difference between the present multiplication factor and the new, smaller multiplication factor is equal to 1. This results in the simple equation that the upper threshold value is equal to the sum of the lower threshold value and the input voltage.

If the further electrical load requires a different load current or if it is intended to be operated temporally independently of the electrical load, the arrangement in one development is advantageously designed for operating a further series circuit comprising means for connecting the further electrical load and the further current sink. For this purpose, the arrangement is supplemented by a further first comparator and a further second comparator. The further first comparator compares the further current sink voltage with a further lower threshold value, which can advantageously assume a different value than the lower threshold value. The further second comparator compares the further current sink voltage with a further upper threshold value. The selection logic then combines the results of the different comparators and determines a new multiplication factor therefrom.

In another development, a plurality of further electrical loads and the associated plurality of further series circuits can be connected up and operated in a corresponding manner.

In one development, the new multiplication factor can be determined by setting a higher multiplication factor if the current sink voltage is less than the lower threshold value and the further current sink voltage is less than the further lower threshold value.

In one development, the new multiplication factor can be determined by setting a lower multiplication factor if the current sink voltage is greater than the upper threshold value and the further current sink voltage is greater than the further upper threshold value.

If a plurality of different loads are to be operated by this voltage converter, then it may be advantageous for not every load to be taken into account in equivalent fashion, but rather for important electrical loads to be taken into account with priority when predetermining the new multiplication factor.

The voltage converter may comprise:
   a first stage, which is coupled at its input to an input of the voltage converter and comprises a first capacitor and a first switching means,
   a second stage, which is coupled at its input to an output of the first stage and is coupled at its output to the output of the voltage converter and comprises a second capacitor and a second switching means, and
   a control unit connected to the control input of the voltage converter and to the first and the second switching means.

The voltage converter therefore may have stages that are constructed in an identical manner. The coupling of the first stage to the input voltage and the coupling of the second stage to the output of the voltage converter can be effected by further stages. If the multiplication factor that can be achieved by these stages is sufficiently high, the coupling can be realized by a simple connection. The coupling can comprise a switching means.

In an advantageous manner, instead of being formed by a simple connection, the coupling can be formed by a smoothing circuit comprising a capacitor which acts as a low-pass filter. The coupling can advantageously be formed by a circuit that acts as a higher-order low-pass filter.

In order to be able to transmit energy from a voltage source to a capacitor and subsequently to isolate the capacitor from the voltage source and to output the energy at a different location in a circuit, up to four switches are necessary. A switching means for a stage of the voltage converter advantageously has three switches. In this case, the first electrode of the first capacitor is connected via a first transfer switch to the input of the first stage and, in a connection without switches, to the output of the first stage. The second electrode of the first capacitor is connected to a reference potential terminal by a first reference potential switch and to the input voltage terminal of the voltage converter by a first raising switch. The control unit, in a first clock phase, switches the first raising switch into an open switching state and the first transfer switch and the first reference potential switch into a closed switching state. In a second clock phase, the control unit switches the first transfer switch and the first reference potential switch into an open switching state and the first raising switch into a closed switching state.

The second switching means is advantageously constructed in a manner analogous to that of the first switching means. The second switching means thus comprises a second transfer switch, a second reference potential switch and a second raising switch. The control unit, in the first clock phase, switches the second transfer switch and the second reference potential switch into an open switching state and the second raising switch into a closed switching state. In the second clock phase, the control unit switches the second transfer switch and the second reference potential switch into a closed switching state and the second raising switch into an open switching state.

Thus in the first clock phase, the first capacitor is charged, the first electrode being at the potential of the input voltage and the second electrode being at the reference potential. In the second clock phase, the second electrode of the first capacitor is raised to the potential of the input voltage. Since the voltage across a capacitor has a continuous profile even during switching operations, the first electrode of the first capacitor is therefore at double the potential of the input voltage. As a result of the second transfer switch being opened, charge can be shifted from the first capacitor to the second capacitor. This operation is repeated periodically, such that after a series of clock phases, the output of the first stage is at double the value of the input voltage and the output of the second stage is at triple the value of the input voltage.

It is possible to provide more than two stages for the voltage converter. In order to achieve a multiplication factor of N, N−1 stages are required.

If the second switching means is coupled to the output of the voltage converter without further stages, then the second switching means is advantageously equipped with only one switch. The first electrode of the second capacitor is provided, analogously to the first switching means, with a transfer switch, which connects the first electrode of the second capacitor to the input of the second stage, and a connection, which connects the first electrode to the output of the second stage. The second electrode of the second capacitor can be coupled to the input voltage. Since the input voltage may be subject to fluctuations, the second electrode is advantageously coupled to the reference potential terminal. The control unit switches the second transfer switch into the open switching state in the first clock phase and into the closed switching state in the second clock phase. In the case of this interconnection, the second switching means has a lower fluctuation of the output voltage than a switching means comprising a plurality of switches.

Using the control unit, a new, smaller multiplication factor can be set by closing the second transfer switch in the first and in the second clock phase. In the first clock phase, both the first capacitor and the second capacitor are then charged by the voltage at the input of the first stage. In the second clock phase, as a result of the parallel opening of the first and second reference potential switches and as a result of the parallel closing of the first and second raising switches, the second electrode of the first and second capacitors is raised, such that charge is output at the output of the second stage from the first and from the second capacitor.

While the second transfer switch is closed in the first and in the second clock phase, the first capacitor is advantageously shut down. This is done for example by the first raising switch and the first reference potential switch being open for the purpose of shutting down the first capacitor. What is thereby achieved is that in the event of switching, the second electrode of the first capacitor is not charged to the input voltage and this charge is subsequently fed to the reference potential. Consequently, the efficiency of the energy utilization is increased by virtue of the first capacitor being shut down.

In an advantageous manner, however, the potential of the second electrode can be defined and not left fluctuating by the raising switch being closed and the reference potential switch being open. The loading of the input voltage can advantageously be reduced further by the raising switch being open instead of the reference potential switch and the reference potential switch being closed instead of the raising switch.

In an analogous manner, the second capacitor can also be shut down instead of the first capacitor in order to increase the efficiency.

In the case of a larger number of stages, the closing of the second transfer switch in order that the new, smaller, multiplication factor takes effect can be carried out at different locations in this cascading of the stages. Those stages which are closest to the output of the voltage converter may be shut down.

In order to be able to set the present multiplication factor to a value that is less than the value N not just by 1 but by a value L, where the value N can be achieved by a voltage converter comprising N−1 stages, the transfer switches of L stages must be closed in the first and in the second clock phase.

Before the transfer switches of directly adjacent stages are closed, firstly the transfer switch of stages that are not directly adjacent can advantageously be closed.

When the second transfer switch is closed in order that the new, smaller multiplication factor takes effect, the clock phases of the subsequent stages are interchanged by the control unit.

In order that a new, larger multiplication factor takes effect, it is necessary to cancel the measures for setting a new, smaller multiplication factor. In this case, the second transfer switch is switched such that it is open in one clock phase and closed in the other clock phase.

In an advantageous manner, the various switches are driven in the temporal order such that a high energy efficiency is achieved. Non-overlapping times are to be complied with, so that the opening of the transfer switches that are to be opened in one clock phase is concluded before the closing of the transfer switches that are to be closed in the same clock phase begins. This prevents the energy of the capacitor of one stage from being forwarded to the input of the stage instead of to the output of the stage.

In order to avoid a short circuit of the input voltage, the raising switch and the reference potential switch of a stage are driven in such a way that they are never closed simultaneously.

In an advantageous manner, the transfer, reference potential and raising switches each comprise a field effect transistor. The threshold voltage of the field effect transistors and the charge type can advantageously be selected in such a way that the current flow from the input voltage via the raising transistor and via the reference potential transistor to the reference potential is kept extremely small. This is the case if the raising switch and the reference potential switch are embodied as an inverter produced using complementary metal oxide semiconductor technology, abbreviated to CMOS technology.

To summarize, the principle proposed has the advantages of:
- a significantly improved efficiency in energy deployment,
- an improved area utilization on the chip as a result of the omission of the current sinks.

Embodiments are explained in more detail below on the basis of a plurality of exemplary embodiments with reference to the figures.

DESCRIPTION OF THE DRAWINGS

FIG. 4b shows the second switching state of the stages from FIG. 4a.

FIG. 5 shows a stage such as may be used as the last stage before the output of the voltage converter.

DETAILED DESCRIPTION

Figure 1:
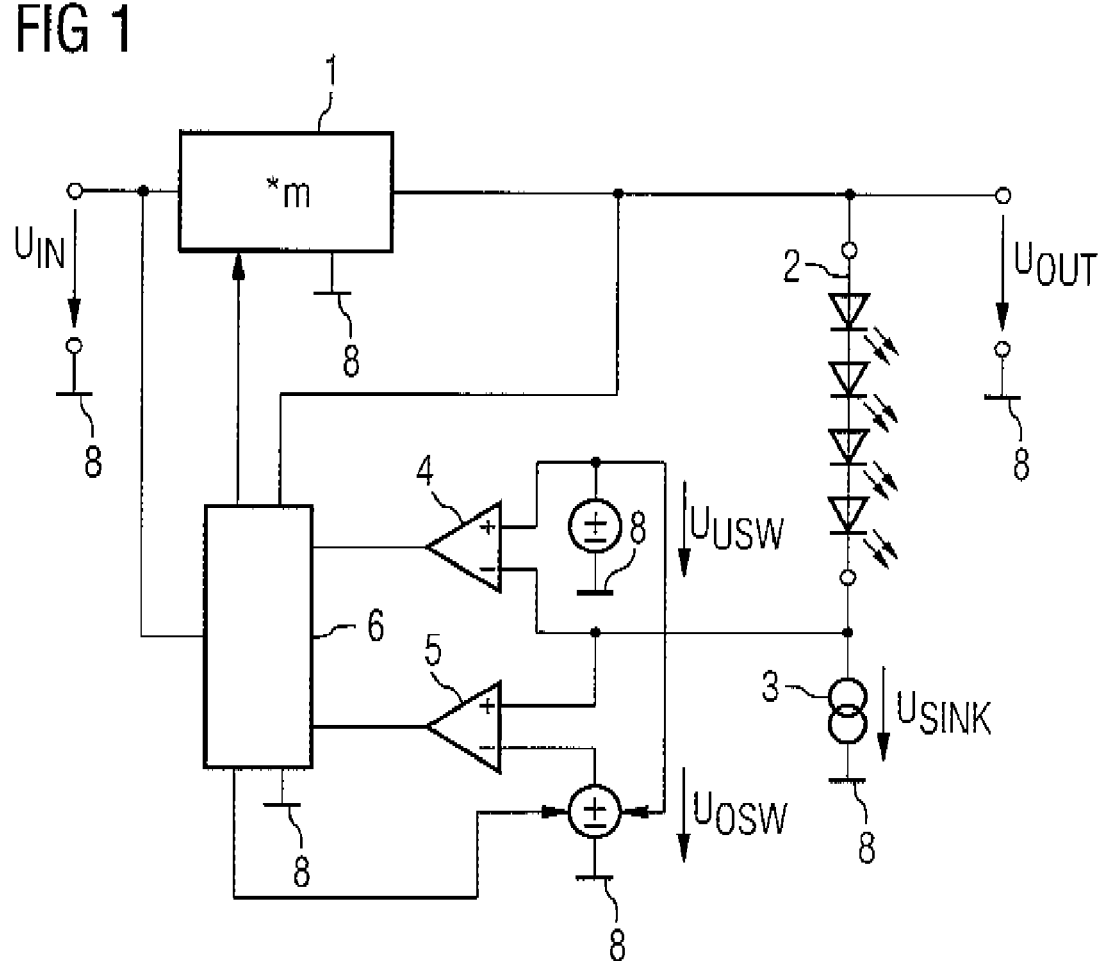
FIG. 1 shows a block diagram of an exemplary embodiment of the arrangement comprising a voltage converter and voltage supply of an electrical load.

FIG. 1 shows a voltage converter 1, which can be connected to an input voltage $U_{IN}$ at a first input and which is connected to a series circuit at an output. The voltage $U_{OUT}$ at the output of the voltage converter 1 has a dependence on the voltage at the first input $U_{IN}$ and on a multiplication factor m. The series circuit comprises means for connecting an electrical load 2 and a current sink 3. In FIG. 1, the electrical load 2 is furthermore connected to the output of the voltage converter 1 and the current sink 3 is connected to the reference potential terminal 8.

The current sink voltage $U_{SINK}$ is compared with a lower threshold value $U_{USW}$ by a first comparator 4 and with an upper threshold value $U_{OSW}$ by a second comparator 5. The results of the two comparators 4, 5 are fed to a selection logic 6, which forwards the present multiplication factor m to the voltage converter 1.

The upper threshold value $U_{OSW}$ is a function of the lower threshold value $U_{USW}$, the adjustable multiplication factors and a variable that can be derived from the input voltage $U_{IN}$. In FIG. 1, the input voltage $U_{IN}$ is fed to the second comparator 5. For this purpose, the second comparator 5 is coupled to the selection logic 6 and the selection logic 6 is coupled to the first input of the voltage converter 1.

In an alternative embodiment, the second comparator 5 can be coupled directly to the input voltage $U_{IN}$. Since the output voltage $U_{OUT}$ is a function of the input voltage $U_{IN}$, in a further alternative embodiment the output voltage $U_{OUT}$ can also be fed to the second comparator 5.

The setting of a smaller multiplication factor m increases the efficiency of the energy consumption of the voltage supply.

Figure 2:
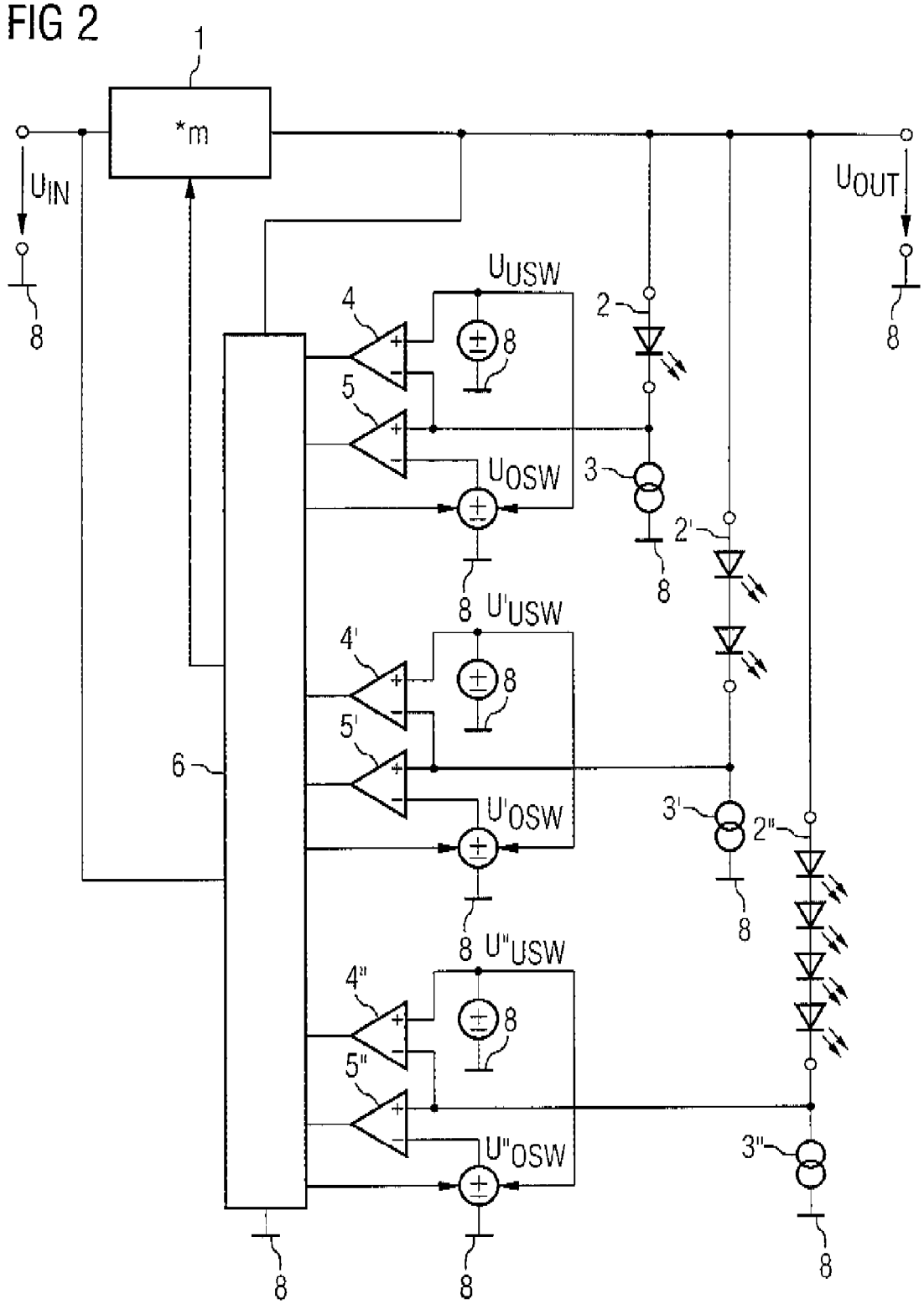
FIG. 2 shows a block diagram of a second exemplary embodiment of the arrangement comprising a voltage converter, namely for supplying a plurality of electrical loads.

The arrangement in FIG. 2 is a development of the arrangement from FIG. 1. The arrangement of FIG. 2 largely corresponds to the arrangement in accordance with FIG. 1 and in this respect will not be described again at this juncture. In the exemplary embodiment in accordance with FIG. 2, three series circuits, each comprising a means for connecting an electrical load 2, 2', 2" and an associated current sink 3, 3', 3", are connected to the voltage converter 1. The three current sink voltages are respectively fed to a first comparator 4, 4', 4" and a second comparator 5, 5', 5". The first and second comparators 4, 4', 4", 5, 5', 5" are linked to the selection logic 6, which feeds the present multiplication factor m to the voltage converter 1.

The multiplication factor m is set on the basis of the signals of the comparators 4, 4', 4", 5, 5', 5" in order to ensure the voltage supply of the electrical loads 2, 2', 2" and to optimize the efficiency. For this purpose, different rules can be implemented in the selection logic 6 depending on the application. The rules advantageously contain a prioritization of the electrical loads 2, 2', 2".

Figure 3:
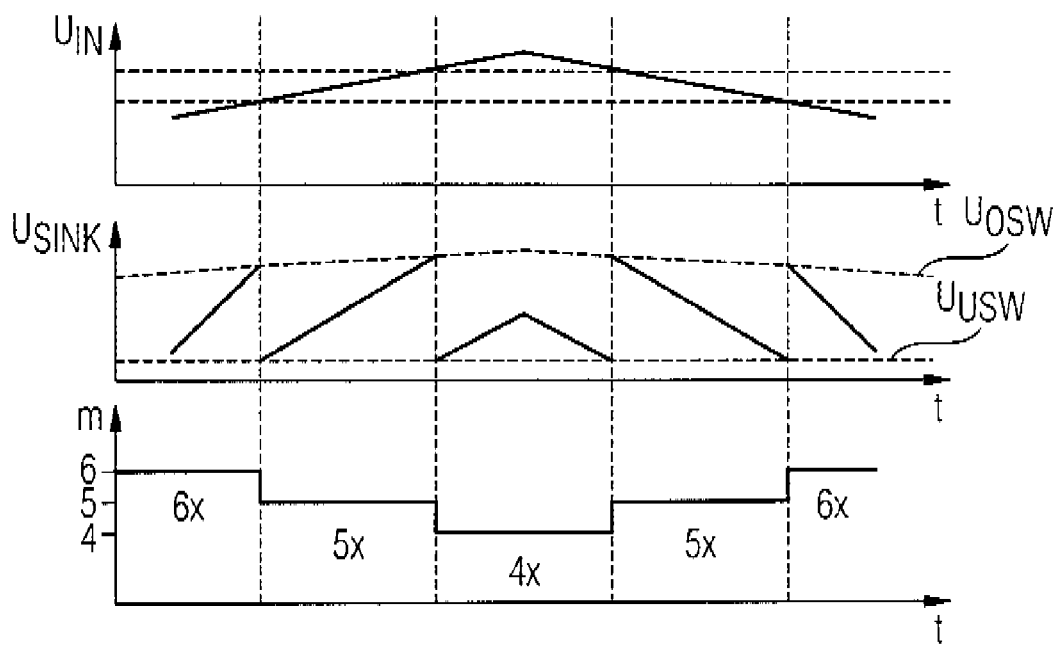
FIG. 3 shows an exemplary profile of the current sink voltage in the case of a rising and a decreasing input voltage.

FIG. 3 shows an exemplary profile of the input voltage $U_{IN}$ with a rising and then decreasing edge. Whole numbers can be selected for the multiplication factor m in this example. The value of the current sink voltage $U_{SINK}$ rises as the input voltage $U_{IN}$ rises, and reaches the upper threshold value $U_{OSW}$. This causes the arrangement to switch back the multiplication factor m, in this example from 6 to 5 and in the further profile from 5 to 4.

Even in the case of a linear rise in the input voltage $U_{IN}$, the current sink voltage $U_{SINK}$, in the case of the different multiplication factors, will likewise rise linearly in sections, but with a gradient that is larger by the multiplication factor m. Therefore, the gradient of the current sink voltage is different despite a constant gradient of the input voltage up to the highest value of the input voltage. This can be seen from the following equation, which is valid to a first approximation:

$$U_{SINK} = m \cdot U_{IN} - U_L,$$

where $U_{SINK}$ is the voltage across the current sink 3, m is the multiplication factor, $U_{IN}$ is the input voltage and $U_L$ is the voltage across the electrical load 2. The voltage $U_L$ across the electrical load 2 is practically constant during operation.

When the input voltage $U_{IN}$ decreases, the current sink voltage $U_{SINK}$ reaches the lower threshold value $U_{USW}$, so that the multiplication factor m is increased first from 4 to 5 and then from 5 to 6.

The upper threshold value $U_{OSW}$ is advantageously not a constant, but rather a variable dependent on the input voltage $U_{IN}$ in the following manner:

$$U_{OSW} = U_{USW} + U_{IN},$$

where $U_{OSW}$ is the upper threshold value, $U_{USW}$ is the lower threshold value and $U_{IN}$ is the input voltage. The equation holds true for a multiplication factor that can be selected from consecutive whole numbers. Thus, in the event of a rise in the input voltage $U_{IN}$ and the attendant changeover of the multiplication factor m, the current sink voltage $U_{SINK}$ will fall directly from the upper threshold value $U_{OSW}$ to the lower threshold value $U_{USW}$.

The upper threshold value $U_{OSW}$ can advantageously be chosen to be somewhat higher than in the above formula in order that, in the event of a changeover of the multiplication factor m, the current sink voltage $U_{SINK}$ does not fall exactly to the lower threshold value $U_{USW}$. This avoids oscillation of the multiplication factor m between two adjacent values.

Figure 4A:
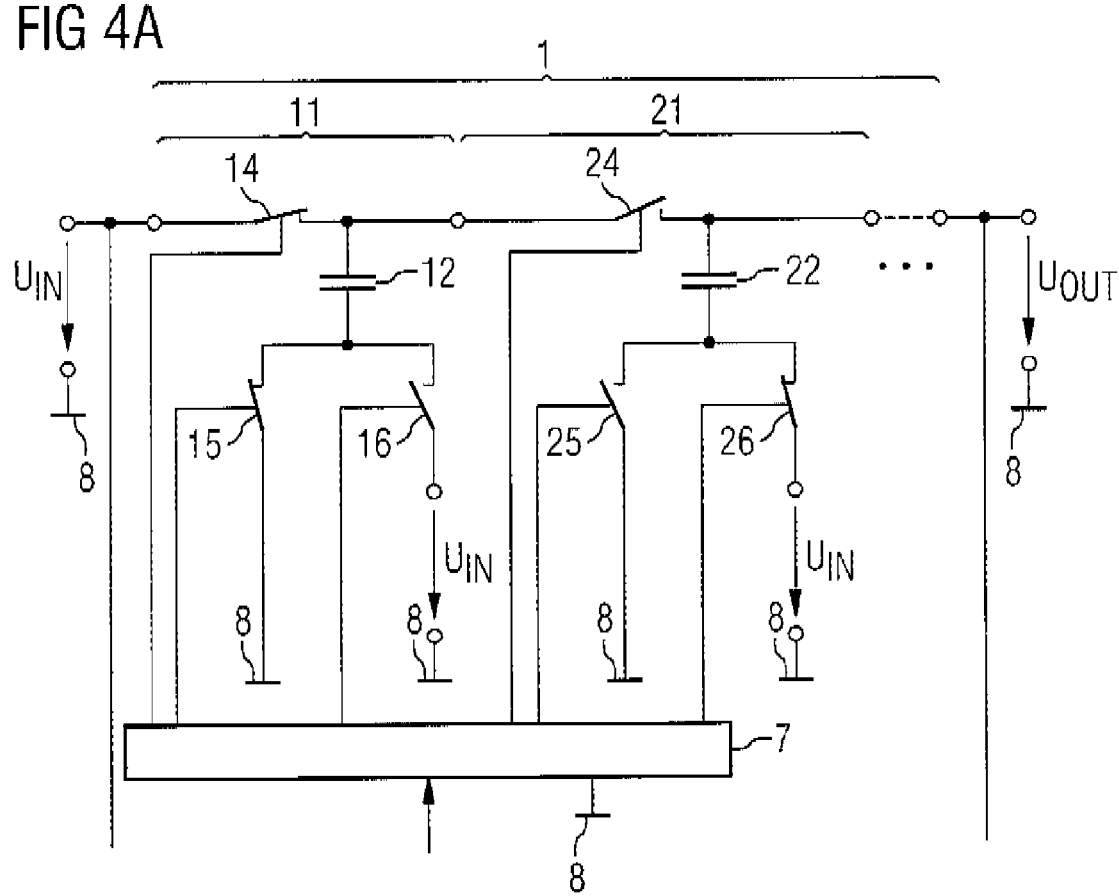
FIG. 4a shows a first switching state of a first and a second stage of an exemplary voltage converter.

FIG. 4a shows by way of example a first stage 11 and a second stage 21 of the voltage converter 1 from FIGS. 1 and 2. The first stage 11 comprises a first capacitor 12, a first transfer switch 14, a first reference potential switch 15 and a first raising switch 16. A first electrode of the first capacitor 12 is connected to an input of the first stage 11 via the first transfer switch 14 and to the output of the first stage 11 via a line. A second electrode of the first capacitor 12 is connected to the reference potential terminal 8 via the first potential terminal switch 15. The input voltage $U_{IN}$ is fed to the second electrode via the first raising switch 16. The input of the first stage 11 is coupled to the input of the voltage converter 1.

The second stage 21 comprises a second capacitor 22, a second transfer switch 24, a second reference potential switch 25 and a second raising switch 26. A first electrode of the second capacitor 22 is connected to an input of the second stage 21, which is connected to the output of the first stage 11, via the second transfer switch 24 and to the output of the second stage 21 via a line. A second electrode of the second capacitor 22 is connected to the reference potential terminal 8 via the second potential terminal switch 25. The input voltage $U_{IN}$ is fed to the second electrode via the second raising switch 26. The output of the second stage 21 is coupled to the output of the voltage converter 1.

FIG. 4a depicts a first switching state in a first clock phase. In the case of said state, in the first stage 11, the first capacitor 12 is charged by the input voltage $U_{IN}$ via the first transfer switch 14. In this case, the second electrode of the first capacitor 12 is at the reference potential since the first reference potential switch 15 is closed. The first raising switch 16 is open.

The second transfer switch 24 is open in the first clock phase, so that the first electrode of the first capacitor 12 and the first electrode of the second capacitor 22 are not conductively connected in the first clock phase. The charge on the second capacitor 22 is available, however, at the output of the second stage 21. The lower electrode of the second capacitor 22 is at the input voltage potential $U_{IN}$ since the second raising switch 26 is closed and the second reference potential switch 25 is open.

The control unit 7 is linked to all the switches 14, 15, 16, 24, 25, 26 for setting the first switching state.

FIG. 4b shows a second switching state in a second clock phase of the arrangement in accordance with FIG. 4a. In the second clock phase, the first capacitor 12 is disconnected from the input of the first stage 11 by virtue of the fact that the first transfer switch 14 is open. The first raising switch 16 is closed, so that directly after the closing of the raising switch, the charge of the first electrode of the first capacitor 12 is at the potential of double the input voltage $U_{IN}$. The first reference potential switch 15 is open.

Since the second transfer switch 24 is closed, charge can flow from the first stage 11 to the second stage 21. The second electrode of the second capacitor 22 is at the reference potential since the second reference potential switch 25 is closed. The second raising switch 26 is open.

The sum of the charges on the first electrode of the first capacitor 12 and the first electrode of the second capacitor 22 does not change, to a first approximation, when the second transfer switch 24 is opened. After the equalize operation, the potential of the first electrode of the first capacitor 12 and that of the first electrode of the second capacitor 22 are identical to a first approximation. At the end of the equalize operation, the voltage across the second capacitor 22 is the sum of the voltage across the first capacitor 12 and the input voltage $U_{IN}$. The equation for charge retention, the equation by way of the voltages and the component equations for the first and the second capacitor 12 and 22 yield to a first approximation the voltage $U_{22}$ across the second capacitor 22 at the end of the second clock phase.

The first and second clock phases alternate periodically, such that the voltage $U_{12}$ across the first capacitor 12 rises asymptotically and presupposing ideal conditions to the value of the input voltage $U_{IN}$ and the voltage $U_{22}$ across the second capacitor 22 rises to double the value of the value of the input voltage $U_{IN}$. In the ideal case, when the second transfer switch is closed, double the value of the input voltage $U_{IN}$ is then available at the output of the first stage 11 and, when a third transfer switch of a third stage is closed, triple the value of the input voltage $U_{IN}$ is then available at the output of the second stage.

The multiplication factor m is fed to the voltage converter 1, FIG. 4a illustrating the first switching state and FIG. 4b illustrating the second switching state with which the multiplication factor that can maximally be obtained with two stages, namely 3, is achieved.

FIG. 5 shows the second stage 71, as is advantageously realized as a stage directly before the output of the voltage converter 1. The second stage 71 comprises the transfer switch 74, which, in the closed state, serves to permit charge to flow from the previous stage to the second capacitor 72. The voltage across the second capacitor 72 is available as output voltage $U_{OUT}$.

Figure 6:
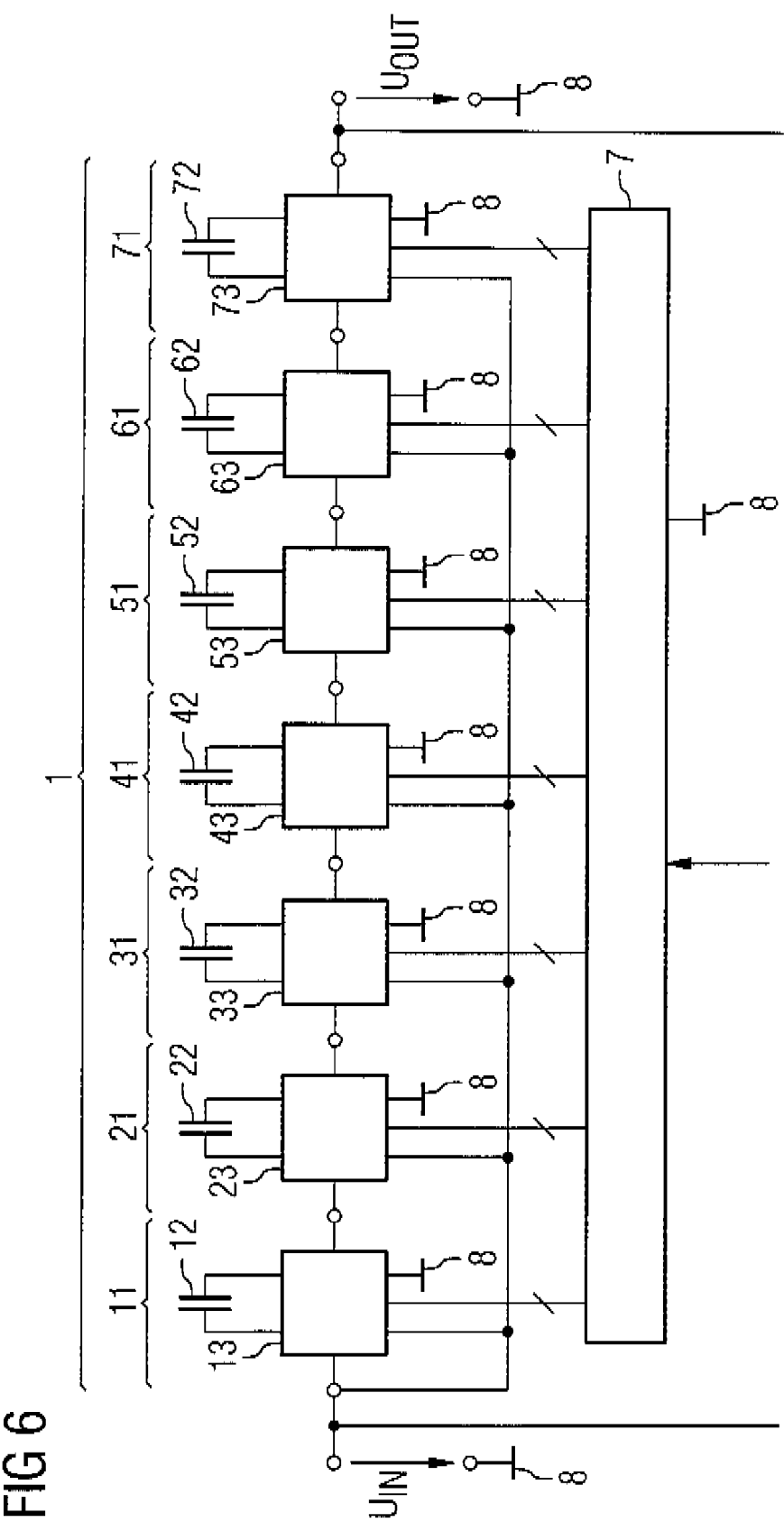
FIG. 6 shows a block diagram of an exemplary embodiment of the voltage converter in seven stages.

FIG. 6 shows a block diagram of the voltage converter 1 with seven stages. The stages 11, 21, 31, 41, 51, 61, 71 comprise a respective capacitor 12, 22, 32, 42, 52, 62, 72 and a respective switching means 13, 23, 33, 43, 53, 63, 73. The switching means 13, 23, 33, 43, 53, 63, 73 are driven by the control unit 7 according to the present multiplication factor m, which is predetermined at the control input of the voltage converter 1. In order to obtain the largest selectable multiplication factor, in the first clock phase, the first, third, fifth and seventh capacitors 12, 32, 52, 72 are charged and the second, fourth and sixth capacitors 22, 42, 62 in each case output energy to the subsequent stage. In the second clock phase, first, third, fifth and seventh capacitors 12, 32, 52, 72 output energy and the second, fourth and sixth capacitors 22, 42, 62 are charged. The forwarding of the energy and the charge is effected by the raising effect. The raising effect is based on the fact that, in the first clock phase, the first, third, fifth and seventh capacitors 12, 32, 52, 72 are charged to a voltage, the second electrode being put at reference potential, and that the potential of the first electrode is then concomitantly raised in the second clock phase by raising the potential of the second electrode to the level of the input voltage $U_{IN}$ of the voltage converter 1. The reason for the concomitant raising is that the energy contained in a capacitor does not change abruptly even during switching operations.

In this embodiment, any value from 1 to 8 can be achieved as multiplication factor m, the value 8 resulting from the number of stages plus 1.

FIG. 7 shows one possible development of the circuit in FIG. 6. In this case, the transfer switches are realized as field effect transistors 17, 27, 37, 47, 57, 67, 77 of the p-channel type and with a threshold voltage, such that they are enhancement mode transistors. This also applies to the field effect transistors 19, 29, 39, 49, 59, 69 forming the raising switches. The reference potential switches are realized as field effect transistors 18, 28, 38, 48, 58, 68 of the n-channel type and likewise as enhancement mode transistors. The output-side stage 71, that is to say the seventh stage, is a stage that brings about a particularly low output voltage fluctuation.

In one embodiment, the raising switch and the reference potential switch of a stage can be realized as a CMOS inverter.

Field effect transistors comprise two current-carrying terminals, called source and drain terminals, and a control terminal, called bulk terminal. Since source and drain are generally formed identically in the semiconductor body, the source terminal and the drain terminal generally differ only during operation on the basis of the applied potentials. In the case of p-channel field effect transistors, drain and source are allocated to the two terminals in such a way that the source terminal is at a higher potential than the drain terminal.

Figure 7A:
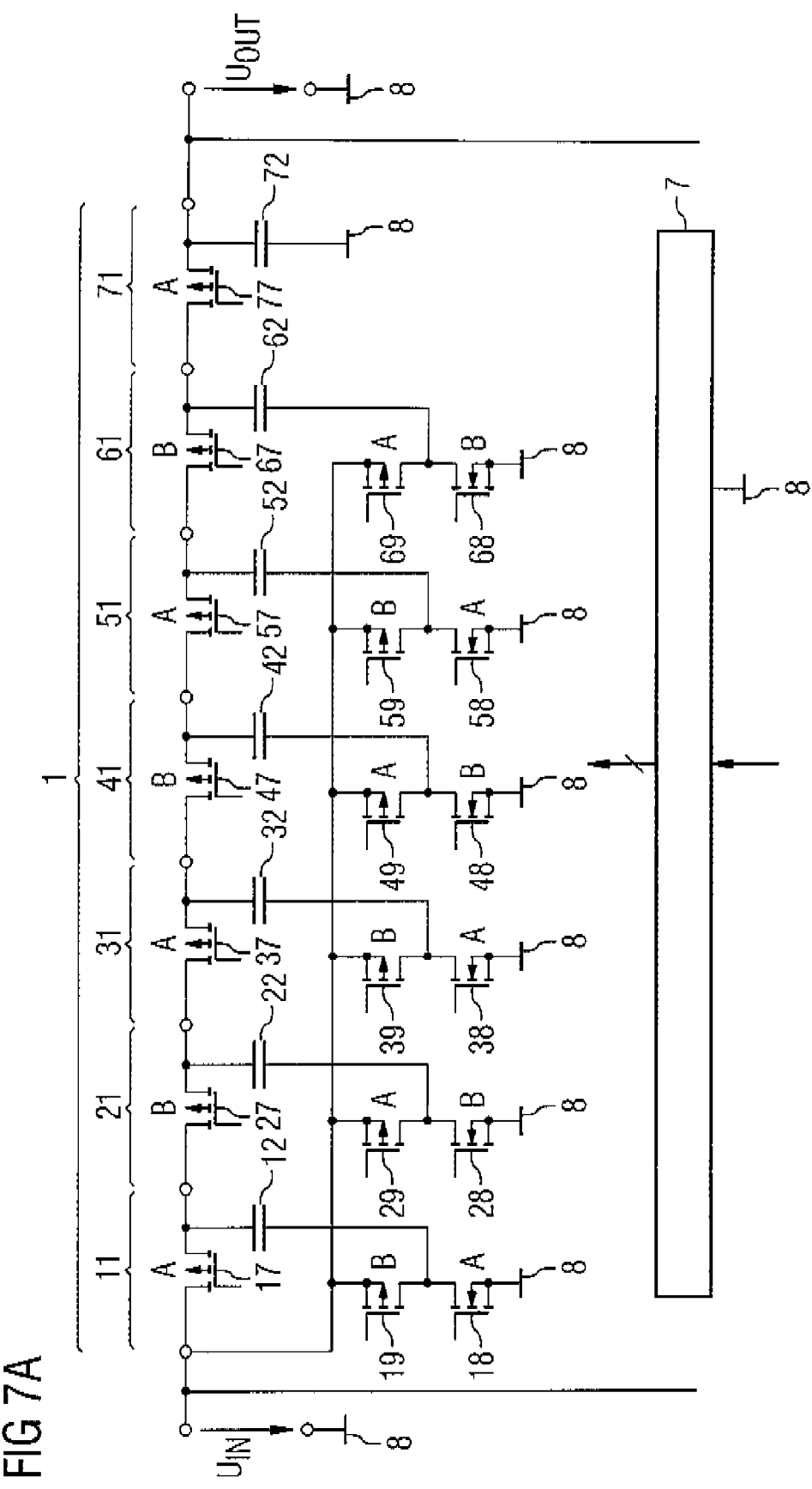
FIGS. 7a to 7c show a circuit diagram of an embodiment of the voltage converter with seven stages on the basis of an example, the switches being formed by field effect transistors, and two circuit diagrams concerning embodiments of a bulk terminal of a field effect transistor.

In accordance with the embodiment in FIG. 7a, the field effect transistors of the transfer switches 17, 27, 37, 47, 57, 67, 77 can have a non-connected bulk terminal. In this case, the bulk of the field effect transistor is raised by parasitic diodes to the potential of that current-carrying terminal which is at a higher potential.

One or a plurality of the field effect transistors 17, 27, 37, 47, 57, 67, 77 can also be switched in such a way that the bulk terminal is connected to that current-carrying terminal which is coupled to the input of the respective stage.

One or a plurality of the field effect transistors 17, 27, 37, 47, 57, 67, 77 can also be switched in such a way that the bulk terminal is connected to that current-carrying terminal which is coupled to the output of the respective stage.

Figure 7B:
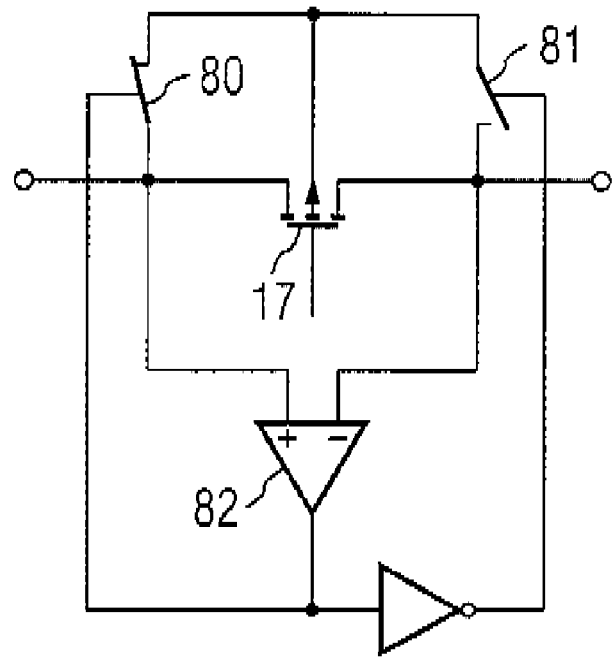

FIG. 7b shows a further embodiment for the bulk terminal of one of the field effect transistors 17, 27, 37, 47, 57, 67, 77. With the aid of a bulk comparator 82, that one of the two bulk switches 80, 81 is closed which connects the bulk to the current-carrying terminal that has the higher potential. The further one of the two bulk switches 80, 81 is open in this case.

Figure 7C:
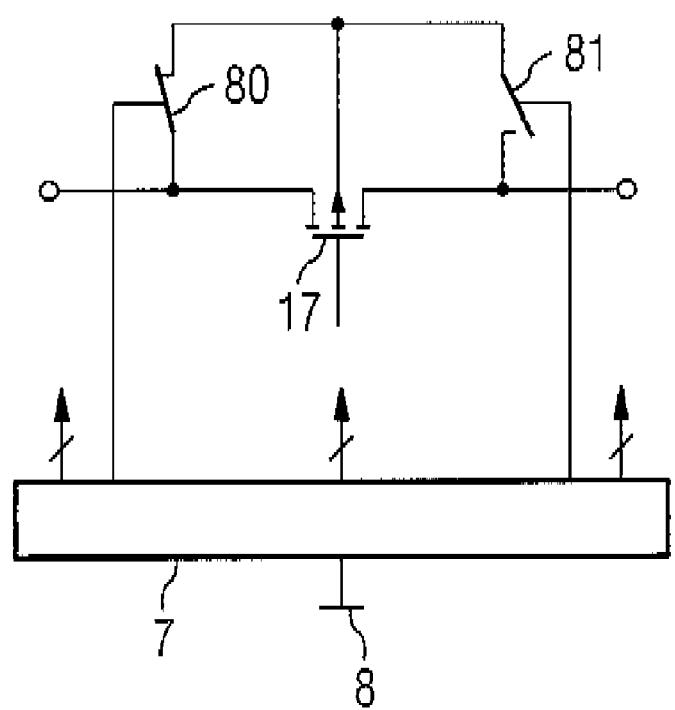

FIG. 7c shows a further embodiment for the bulk terminal of one of the field effect transistors 17, 27, 37, 47, 57, 67, 77. In this embodiment, two bulk switches 80, 81 are switched in a manner dependent on the other switches. Since it is known in advance which of the current-carrying terminals has a higher potential, on account of the information as to which clock phase the circuit is in, the bulk terminal, as early as before the switching of one of the field effect transistors 17, 27, 37, 47, 57, 67, 77, can be connected to that one of the two transistor terminals which has the higher potential. For this purpose, the two bulk switches 80, 81 can be connected to the control unit 7.

The bulk terminals of each of the field effect transistors 17, 27, 37, 47, 57, 67, 77 can be connected up in the same way according to one of the methods shown. However, the bulk connections can also be connected up in different ways according to one of the methods shown.

What is claimed is:

1. An apparatus comprising:
   a voltage converter for supplying voltage to an electrical load, the voltage converter being electrically connected at an output to a terminal of a series circuit comprising means for connecting the electrical load and a current sink, wherein the voltage supplied by the voltage converter is based on an input voltage and on a present multiplication factor;
   a first comparator circuit, which is electrically connected at a sampling input to the current sink, for receiving a current sink voltage, and which is configured to compare the current sink voltage to a lower threshold value;
   a second comparator circuit, which is electrically connected at a sampling input to the current sink, for receiving the current sink voltage and for determining an upper threshold value, the upper threshold value being based on the present multiplication factor, based on a new, smaller multiplication factor, based on the lower threshold value, and based on a signal derived from the input voltage, and the second comparator circuit being configured to compare the current sink voltage with the upper threshold value; and
   selection logic, which is electrically connected to outputs of the first and second comparator circuits and to a control input of the voltage converter, for determining the present multiplication factor, the selection logic being configured to determine a new, larger multiplication factor relative to the present multiplication factor, the new, larger multiplication factor being determined from a set of selectable values if the current sink voltage falls below the lower threshold value, and, the selection logic being configured to determine the new, smaller multiplication factor if the current sink voltage exceeds the upper threshold value.

2. The apparatus of claim 1, further comprising:
   means for determining the lower threshold value.

3. The apparatus of claim 1, wherein the second comparator circuit is configured to determine the upper threshold value according to the following relationship:

$$U_{OSW} = U_{USW} + U_{IN} \cdot (m_{PRES} - m_{NEW}),$$

where $m_{PRES}$ is the present multiplication factor, $m_{NEW}$ is the new, smaller multiplication factor, $U_{IN}$ is the input voltage, $U_{USW}$ is the lower threshold value and $U_{OSW}$ is the upper threshold value.

4. The apparatus of claim 1, further comprising:
   a further series circuit comprising a further electrical load and a further current sink, the further series circuit being electrically connected to an output of the voltage converter at a terminal;
   a further first comparator circuit, which is electrically connected at a sampling input to the further current sink, for receiving a further current sink voltage, and which is configured to compare the further current sink voltage to a further lower threshold value; and
   a further second comparator circuit, which is electrically connected at a first sampling input to the further current sink, for receiving the further current sink voltage, and which is configured to compare the further current sink voltage to a further upper threshold value;
   wherein the selection logic is electrically connected to outputs of the further first comparator circuit and the further second comparator circuit, and wherein the selection logic is configured to determine a new multiplication factor based on comparison results of the first comparator circuit and the second comparator circuit and on comparison results of the further first comparator circuit and the further second comparator circuit.

5. The apparatus of claim 1, wherein the voltage converter comprises:
   a first stage, which is electrically connected at an input to an input of the voltage converter, the first stage comprising a first capacitor and a first switching means;
   a second stage, which is electrically connected at an input to an output of the first stage, the second stage comprising an output that is electrically connected to an output of the voltage converter, and the second stage comprising a second capacitor and a second switching means; and
   a control unit electrically connected to the control input of the voltage converter and to the first switching means and the second switching means.

6. The apparatus of claim 5, wherein the first switching means comprises:
   a first transfer switch to electrically connect a first electrode of the first capacitor to the input voltage at the first stage;
   a first reference potential switch to electrically connect a second electrode of the first capacitor to a reference potential terminal; and
   a first raising switch to pass the input voltage to the second electrode of the first capacitor;
   wherein the first electrode of the first capacitor is electrically connected to the output of the first stage; and
   wherein the control unit is configured to perform control (i) so that, in a first clock phase, the first raising switch is open, and the first transfer switch and the first reference potential switch are closed, and (ii) so that, in a second clock phase, the first transfer switch, the first reference potential switch, and the first raising switch are in a complementary switching states relative to the first clock phase.

7. The apparatus of claim 5, wherein the second switching means comprises:
   a second transfer switch to electrically connect a first electrode of the second capacitor to the input voltage at the second stage;
   a second reference potential switch to electrically connect a second electrode of the second capacitor to a reference potential terminal; and
   a second raising switch to pass the input voltage to the second electrode of the second capacitor;
   wherein the first electrode of the second capacitor is electrically connected to the output of the second stage; and
   wherein the control unit is configured to perform control (i) so that, in the first clock phase, the second transfer switch and the second reference potential switch are open, and the second raising switch is closed, and (ii) so that, in the second clock phase, the second transfer switch, the second reference potential switch, and the second raising switch, are in complementary switching states relative to the first clock phase.

8. The apparatus of claim 5, wherein the second switching means comprises:
   a second transfer switch to electrically connect a first electrode of the second capacitor to the input voltage at the second stage;
   wherein a second electrode of the second capacitor is electrically connected to a reference potential terminal;
   wherein the first electrode of the second capacitor is electrically connected to the output of the second stage; and
   wherein the control unit is configured to perform control (i) so that, in the first clock phase, the second transfer switch is open, and (ii) so that, in the second clock phase, the second transfer switch is in a complementary switching state relative to the first clock phase.

9. The apparatus of claim 7, wherein the control unit is configured to close the second transfer switch in the first clock phase and in the second clock phase for the new, smaller multiplication factor to take effect.

10. The apparatus of claim 7, wherein the control unit is configured to set different switching states of the second transfer switch in the first clock phase and in the second clock phase for the new, larger multiplication factor to take effect.

11. The apparatus of claim 6, wherein the first transfer switch, the first reference potential switch, and the first raising switch each comprises a field effect transistor.

12. A method for supplying voltage to an electrical load, comprising:
using a voltage converter to generate voltage to supply to a series circuit, the series circuit comprising the electrical load electrically connected to a current sink, the voltage supplied being based on an input voltage and on a present multiplication factor;
comparing a current sink voltage across the current sink to a lower threshold value;
determining an upper threshold value based on the present multiplication factor, based on a new, smaller multiplication factor, based on the lower threshold value, and based on a signal derived from the input voltage;
comparing the current sink voltage to the upper threshold value;
determining a new, larger multiplication factor from a set of selectable values if the current sink voltage falls below the lower threshold value; and
determining a value of the new, smaller multiplication factor if the current sink voltage exceeds the upper threshold value.

13. The method of claim 12, further comprising:
determining the lower threshold value.

14. The method of claim 13, wherein the upper threshold value is determined according to the following relationship:

$$U_{OSW} = U_{USW} + U_{IN} \cdot (m_{PRES} - m_{NEW}),$$

where $m_{PRES}$ is the present multiplication factor, $m_{NEW}$ is the new, smaller multiplication factor, $U_{IN}$ is the input voltage, $U_{USW}$ is the lower threshold value, and $U_{OSW}$ is the upper threshold value.

15. The method of claim 12, further comprising:
using the voltage converter to generate voltage to supply to a further series circuit, the further series circuit comprising a further electrical load and a further current sink;
comparing a further current sink voltage across the further current sink to a further lower threshold value;
comparing the further current sink voltage to a further upper threshold value; and
determining a new multiplication factor based on results of the comparisons of the current sink voltage to the lower threshold value and the upper threshold value and also based on comparisons of the further current sink voltage to the further lower threshold value and the further upper threshold value.

16. The method of claim 12, further comprising
charging and discharging a first capacitor, which, together with a first switching means, comprises a first stage of the voltage converter, wherein an input of the first stage is electrically connected to an input of the voltage converter;
charging and discharging a second capacitor, which, together with a second switching means, comprises a second stage of the voltage converter, wherein an input of the second stage is electrically connected to an output of the first stag, and wherein an output of the second stage is electrically connected to an output of the voltage converter; and
controlling the first switching means and the second switching means based on the present multiplication factor.

17. The method of claim 16, further comprising:
periodically changing the first switching means between a first clock phase and a second clock phase
so that, in the first clock phase:
a first raising switch, which passes the input voltage to a second electrode of the first capacitor, is opened;
a first transfer switch, which electrically connects a first electrode of the first capacitor to the input voltage at the first stage, is closed; and
a first reference potential switch, which passes a reference potential to the second electrode of the first capacitor, is closed; and
so that, in the second clock phase:
the first transfer switch, the first reference potential switch, and the first raising switch are in complementary switching stages relative to the first clock phase; and
so that a potential at the first electrode of the first capacitor is present at the output of the first stage in the first clock phase and in the second clock phase.

18. The method of claim 16, further comprising
periodically changing the second switching means between the a first clock phase and a second clock phase
so that, in the first clock phase:
a second transfer switch, which electrically connects a first electrode of the second capacitor to the input voltage at the second stage, is opened; and
a second reference potential switch, which passes a reference potential to a second electrode of the second capacitor, is opened; and
a second raising switch, which passes the input voltage to the second electrode of the second capacitor, is closed;
so that, in the second clock phase:
the second transfer switch, the second reference potential switch, and the second raising switch, are in complementary switching states relative to the first clock phase; and
so that a potential at the first electrode of the second capacitor is present at the output of the second stage in the first clock phase and in the second clock phase.

19. The method of claim 16, further comprising:
periodically changing the second switching means between a first clock phase and a second clock phase
so that, in the first clock phase, a second transfer switch, which electrically connects a first electrode of the second capacitor to the input voltage at the second stage, is opened; and
so that, in the second clock phase, the second transfer switch is in a complementary switching state relative to the first clock phase; and
so that a potential at the first electrode of the second capacitor is present at the output of the second stage in the first clock phase and in the second clock phase.

20. The method of claim 18, further comprising:
closing the second transfer switch in the first clock phase and in the second clock phase for the new, smaller multiplication factor to take effect.

21. The method of claim 18, further comprising:
setting different switching states of the second transfer switch in the first clock phase and in the second clock phase for the new, larger multiplication factor to take effect.

* * * * *

UNITED STATES PATENT AND TRADEMARK OFFICE
CERTIFICATE OF CORRECTION

PATENT NO. : 7,778,055 B2  Page 1 of 1
APPLICATION NO. : 11/908732
DATED : August 17, 2010
INVENTOR(S) : Peter Trattler It is certified that error appears in the above-identified patent and that said Letters Patent is hereby corrected as shown below:

Column 12, Claim 6, Line 32 (Approx.);
After "in" Delete "a"

Column 13, Claim 15, Line 50 (Approx.);
Before "comparisons" Delete "the"

Column 13, Claim 16, Line 54;
After "comprising" Insert -- : --

Column 13, Claim 16, Line 55;
Delete "capacitor," and Insert -- capacitor --

Column 13, Claim 16, Line 60;
Delete "capacitor," and Insert -- capacitor --

Column 13, Claim 16, Line 64;
Delete "stag," and Insert -- stage, --

Column 14, Claim 18, Line 23;
After "comprising" Insert -- : --

Column 14, Claim 18, Line 25;
After "between" Delete "the"

Column 14, Claim 19, Line 49;
After "opened;" Delete "and"

Signed and Sealed this
Twenty-sixth Day of June, 2012

David J. Kappos
*Director of the United States Patent and Trademark Office*